Aug. 16, 1932.    W. S. LOCKE    1,871,811
PAN LIFTER
Filed June 22, 1931
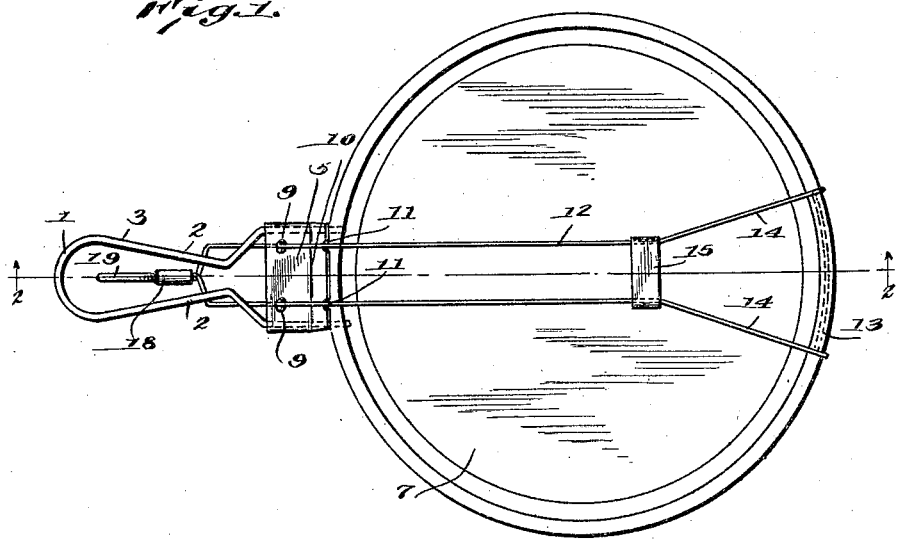
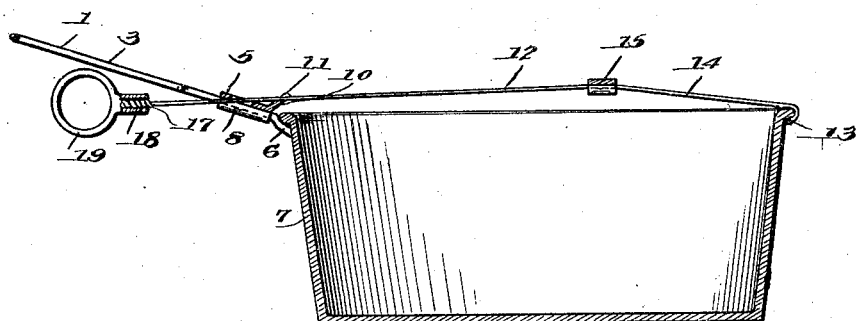
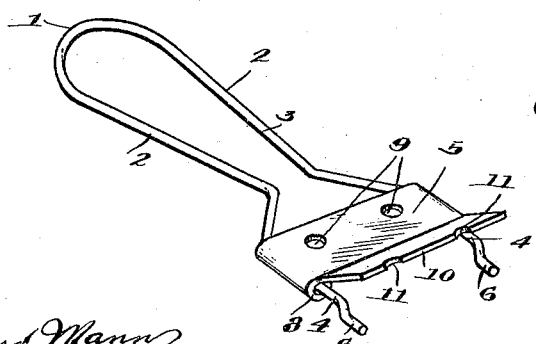
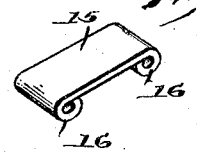
WITNESSES
INVENTOR
W. S. Locke,
BY
ATTORNEY Patented Aug. 16, 1932

1,871,811

UNITED STATES PATENT OFFICE

WILLIAM S. LOCKE, OF PORTLAND, OREGON

PAN LIFTER

Application filed June 22, 1931. Serial No. 546,112.

My invention relates to improvements in pan lifters, and it consists in the combinations, constructions and arrangements herein described and claimed.

It is an object of my invention to provide a device for lifting hot pans, kettles and the like in such manner that the user's hands and arms may be protected from receiving burns.

Another object is to provide a device of this character in which there is a positive gripping action controlled by the hand of the user.

A further object is to provide a device of this kind which will be durable, inexpensive and easy to manufacture.

Other objects and advantages will become apparent in the following specification, and the novel features of the invention will be particularly pointed out in the appended claims.

My invention is illustrated in the accompanying drawing, forming part of this application, in which:—

Figure 1 is a top plan view of the device in engagement with a pan,

Figure 2 is a sectional elevation taken along line 2—2 of Figure 1,

Figure 3 is a perspective view of the handle portion of my device, hereinafter to be more fully described, and Figure 4 is a perspective view of a brace, also to be more fully described.

Referring more particularly to the drawing, I have shown therein a handle portion 1 formed from a single piece of wire bent into a U-shape intermediate its ends and having arms 2 converging inwardly to form a handgrip, hereinafter designated by the numeral 3.

Thence the arms diverge in the same plane as the hand grip 3 to form a pair of parallel supports 4 for a brace plate 5, hereinafter more fully described. The ends of said wire are formed into L-shaped gripping members 6 for engaging the under edge of the rim of a pan 7.

The brace-plate 5 has a pair of marginal lugs 8 bent around the parallel supports 4 to hold the same in position, and also has a pair of openings 9 cut therein.

Integral with the brace-plate 5 and extending upwardly at an angle therefrom, so that in operative position it extends slightly over the rim of the pan 7, is a guide plate 10 having a pair of grooves cut in its outer edge and spaced at an equal distance apart as the openings 9.

A spanner arm 12 is also provided, and is likewise formed of a single piece of wire bent intermediate its ends to form an arc-shaped gripping member 13 which is adapted to engage the rim of the pan at the opposite side to that engaged by the L-shaped gripping member 6.

From the arc-shaped member, the ends of this wire form a pair of arms 14 which converge toward each other for a short distance to a brace-plate 15 having marginal lugs 16 curved around the said arms for affixing the same permanently thereto. From the brace-plate 16 the arms extend parallel to each other toward the handle portion 1, are slidably mounted in the grooves 11, pass through the openings 9 and thence converge and are twisted together as shown at 17.

Surrounding and permanently attached to this twisted portion 17 is a collar 18 having integral therewith an actuating ring 19.

When it is desired to lift a hot pan or like vessel, the operator places his hand around the hand grip 3 in such a manner that his index finger may pass through the actuating ring 19. He then moves the ring forwardly. This causes the arc-shaped member 13 to move away from the L-shaped gripping members 6. The device is then laid over the pan to be lifted and the actuating ring is pulled backwardly so that the gripping members will all tightly engage the pan. While the device is in this position the pan may be moved from place to place without the necessity of touching the same with the hands.

It will be noted that the members of the spanner arm 12 are held securely in position by the fact that these members pass through openings 9 and grooves 11 which openings and grooves have sharpened edges. The plate 5 and the plate 10 are angularly disposed so that when the device is adjusted to grip and raise a pan, the weight of the pan will cause the members of the spanner arm 12 to be gripped tightly by the edges of the openings 9 and grooves 11, thus holding the parts in position. This obviates the necessity of auxiliary means such as a spring to keep the parts from moving while a vessel is being transferred from one place to another.

The brace 15 acts to strengthen the spanner arm 12 and also to keep the same in alignment with the handle portion 1.

Changes in detail may be made to the form of the invention shown and described without departing from the spirit of the invention or the scope of the following claims.

I claim as new and desire to secure by Letters Patent:

1. A pan lifter comprising a handle provided with a gripping member, a brace plate mounted upon the handle near the gripping portion thereof and having an opening, a guide plate secured to said brace plate and inclined at an angle relative thereto, said guide plate having a recess in alignment with the opening in said brace plate, an arm extending through the opening in the brace plate and through the groove in the guide plate, said arm having a gripping portion on one end thereof and being provided with a handle at the other end.

2. A pan lifter comprising a looped wire handle having its ends formed into L-shaped gripping members, a brace plate mounted upon said handle near said gripping members, said brace plate having a pair of openings, a guide plate secured to said brace plate and extending at an angle thereto, said guide plate having grooves registering with said openings, a spanner arm formed of a single piece of wire having an arc-shaped gripping member, and a pair of parallel arms slidably disposed in the grooves and passing through the openings, the opposite end of the spanner arm having a handle portion.

WILLIAM S. LOCKE.